US012708926B1

(12) United States Patent
Liu

(10) Patent No.: US 12,708,926 B1
(45) Date of Patent: Aug. 18, 2026

(54) GLUE BOTTLE

(71) Applicant: Yu Liu, Guangdong Province (CN)

(72) Inventor: Yu Liu, Guangdong Province (CN)

( * ) Notice: Subject to any disclaimer, the term of this patent is extended or adjusted under 35 U.S.C. 154(b) by 0 days.

(21) Appl. No.: 19/220,194

(22) Filed: May 28, 2025

(30) Foreign Application Priority Data

May 16, 2025 (CN) ......................... 202520974289.0

(51) Int. Cl.

| | |
|---|---|
| ***B05C 17/005*** | (2006.01) |
| ***A46B 11/00*** | (2006.01) |
| ***A46D 1/00*** | (2006.01) |
| ***B05C 17/02*** | (2006.01) |
| ***B05C 17/025*** | (2006.01) |
| ***B65D 35/36*** | (2006.01) |
| ***B65D 47/12*** | (2006.01) |
| ***B65D 47/42*** | (2006.01) |
| ***B65D 51/32*** | (2006.01) |

(52) U.S. Cl.

CPC .... *B05C 17/00583* (2013.01); *A46B 11/0041* (2013.01); *A46D 1/0207* (2013.01); *B05C 17/00516* (2013.01); *B05C 17/0052* (2013.01); *B05C 17/0245* (2013.01); *B05C 17/025* (2013.01); *B65D 35/36* (2013.01); *B65D 47/128* (2013.01); *B65D 47/42* (2013.01); *B65D 51/32* (2013.01); *A46B 2200/20* (2013.01)

(58) Field of Classification Search

CPC ........ B43M 11/06; B44D 3/162; B44D 3/164; B05C 17/10

USPC .................................................. 401/262, 266

See application file for complete search history.

(56) References Cited

U.S. PATENT DOCUMENTS

| | | | | |
|---|---|---|---|---|
| 3,088,470 A * | 5/1963 | Hall | A45D 40/26 401/266 | |
| 7,168,877 B2 * | 1/2007 | Park | B05C 17/0325 401/9 | |
| 7,314,328 B2 * | 1/2008 | Liberatore | B65D 83/76 401/265 | |
| 8,777,506 B2 * | 7/2014 | Akaishi | B05C 17/00576 401/265 | |
| 9,713,937 B2 * | 7/2017 | Li | B65D 41/04 | |
| 2006/0179594 A1 * | 8/2006 | Yeung | A46B 1/00 15/187 | |
| 2009/0103970 A1 * | 4/2009 | Lee | A45D 40/26 401/265 | |

* cited by examiner

*Primary Examiner* — David P Angwin
*Assistant Examiner* — Bradley S Oliver
(74) *Attorney, Agent, or Firm* — Tsz Lung Yeung

(57) ABSTRACT

A glue bottle includes a bottle body used for a user to hold and a bottle cap detachably connected to the bottle body. A first accommodating cavity used for holding glue is defined in the bottle body. A top portion of the first accommodating cavity is a first opening. A glue outlet hole in communication with the first accommodating cavity is defined in the bottle cap. A glue applying structure is provided on the bottle cap. The glue applying structure includes a glue applying end portion for smoothing the glue. The glue applying end portion is in a long strip shape. The glue outlet hole is used for discharging glue when the bottle body is squeezed by the user. The glue applying end portion is configured to move to apply the glue flowing out of the glue outlet hole to a target surface when the user moves the bottle body.

17 Claims, 13 Drawing Sheets

GLUE BOTTLE

CROSS-REFERENCE TO RELATED APPLICATIONS

The application claims priority of Chinese patent application 2025209742890, filed on May 16, 2025, which is incorporated herein by reference in its entireties.

TECHNICAL FIELD

The present invention relates to the technical field of liquid containers, and in particular, to a glue bottle.

BACKGROUND ART

As is well known, a glue bottle is a container for holding glue, and glue is used to bond and fix two objects together. However, in existing glue bottles, a glue outlet hole used for discharging glue is generally formed in a top portion of the bottle. To facilitate direct glue application, such bottles are additionally equipped with a glue applying member for smoothing the glue. When applying glue, it is necessary to first squeeze the glue in the glue bottle onto a target surface that needs to be coated, and then apply the glue evenly on the target surface through the glue applying member. This operation method is cumbersome and cannot achieve simultaneous glue application, which affects the efficiency of glue application. In addition, the small size of the glue applying member makes it inconvenient for users to hold and use, which affects the user experience. Moreover, the independent glue applying member will increase the cost of the product.

SUMMARY

The main objective of the present invention is to provide a glue bottle for solving the problems of inconvenient user operation and affecting the glue application rate caused by existing glue bottles being additionally configured with glue applying member.

In order to solve the above technical problems, the present invention provides the following technical solution.

A glue bottle includes a bottle body for a user to hold and a bottle cap detachably connected to the bottle body. A first accommodating cavity used for holding glue is defined in the bottle body. A top portion of the first accommodating cavity is a first opening.

A glue outlet hole in communication with the first accommodating cavity is defined in the bottle cap. A glue applying structure is provided on the bottle cap. The glue applying structure includes a glue applying end portion for smoothing the glue. The glue applying end portion is in a long strip shape. The glue outlet hole is used for discharging glue when the bottle body is squeezed by the user. The glue applying end portion is used for moving when the user moves the bottle body, so as to apply the glue flowing out of the glue outlet hole to a target surface.

The present invention has the following beneficial effects. Compared with the prior art, in the present embodiment, the glue applying structure is configured on the bottle cap, the glue applying structure includes the glue applying end portion in a long strip shape for applying glue evenly, and the bottle body can be held by the user, so that when the user squeezes the bottle body, the glue flows out from the glue outlet hole and then can be directly applied to the target surface through the glue applying end portion, achieving quick and thin glue application, and making the applied glue have a certain width, effectively improving the efficiency and uniformity of glue application, effectively optimizing the user experience, and being particularly suitable for bonding and fixing operations on a surface of a jigsaw puzzle. Moreover, the glue applying end portion is in a long strip shape, so that corners can also be applied with glue, making it convenient for the user to use. Furthermore, the glue applying structure is directly configured on the bottle cap, and the bottle cap is used in conjunction with the bottle body, which makes it convenient for the user to use the glue applying end portion for glue applying and reduces costs. This solves the problem that separating an existing glue applying member from the glue bottle increases costs and makes it inconvenient for the user to hold and use the glue applying member.

BRIEF DESCRIPTION OF THE DRAWINGS

Implementations of the present disclosure will now be described, by way of embodiment, with reference to the attached figures. It should be understood, the drawings are shown for illustrative purpose only, for ordinary person skilled in the art, other drawings obtained from these drawings without paying creative labor by an ordinary person skilled in the art should be within scope of the present disclosure.

DETAILED DESCRIPTION OF THE EMBODIMENTS

Figure 1:
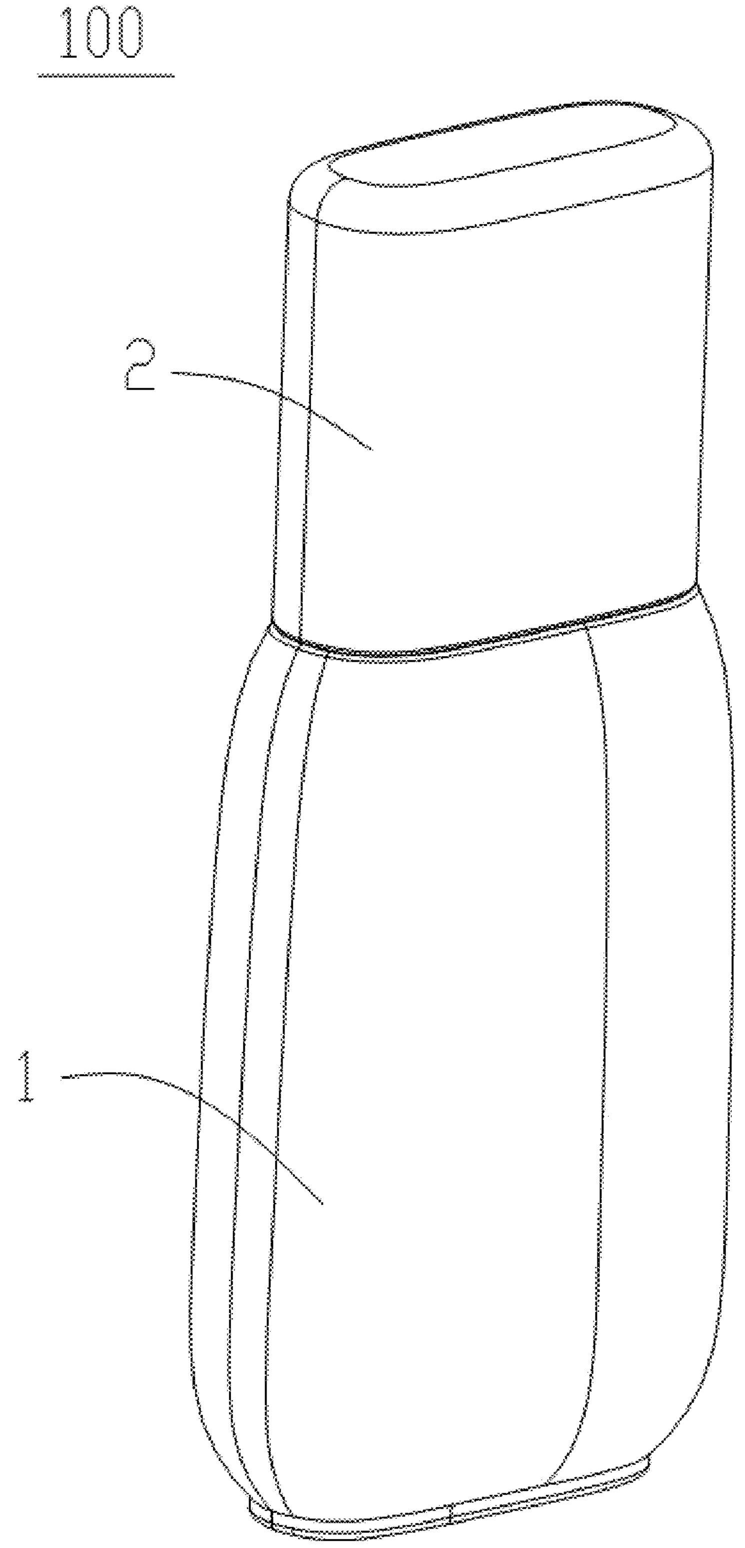
FIG. 1 is a perspective view of the present invention with a glue applying structure as a scraping plate.
Figure 2:
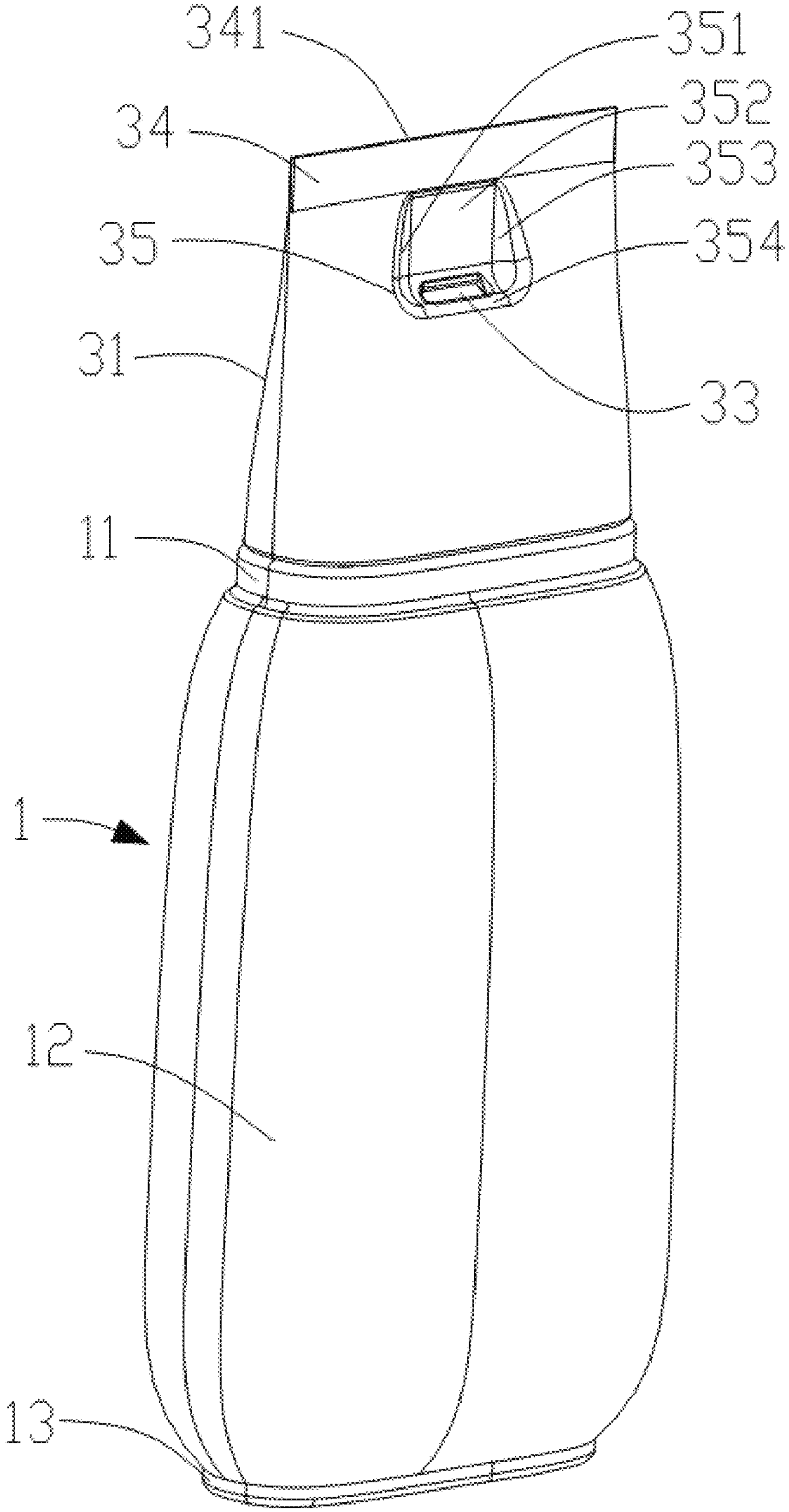
FIG. 2 is a schematic diagram of the present invention with a glue applying structure as a scraping plate and with an outer cover removed.
Figure 3:
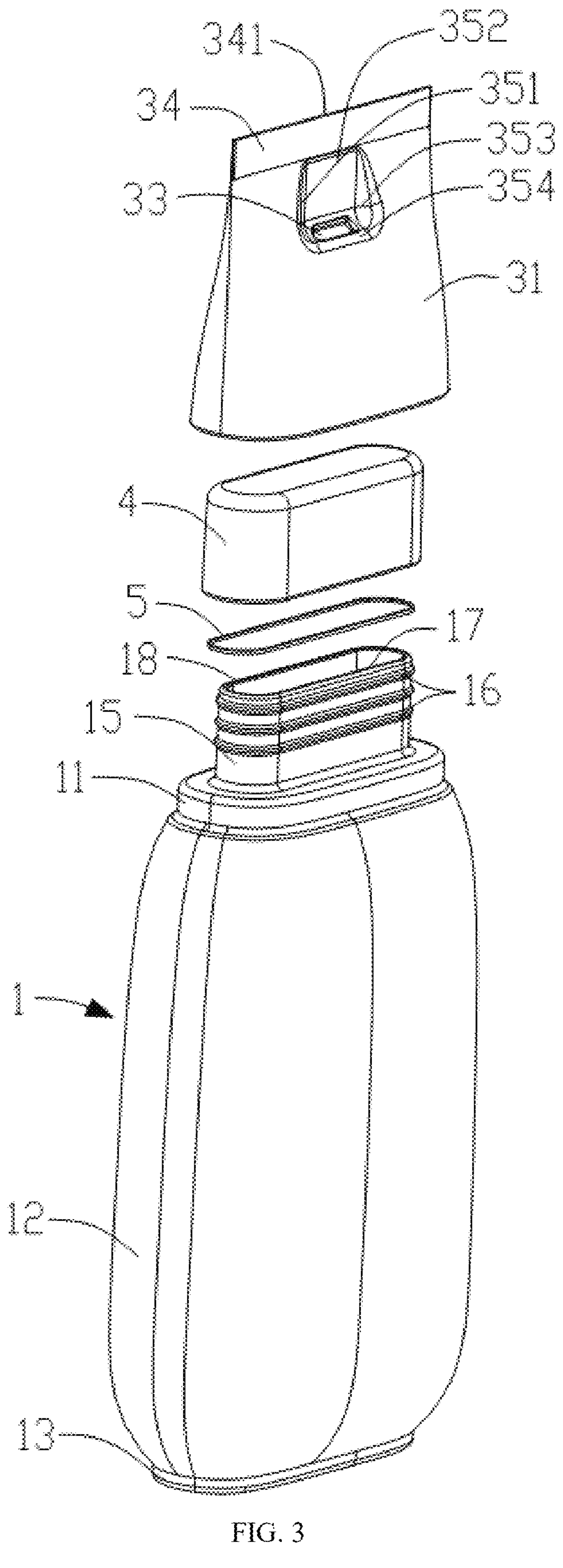
FIG. 3 is an exploded view of the present invention with a glue applying structure as a scraping plate and with an outer cover removed.
Figure 4:
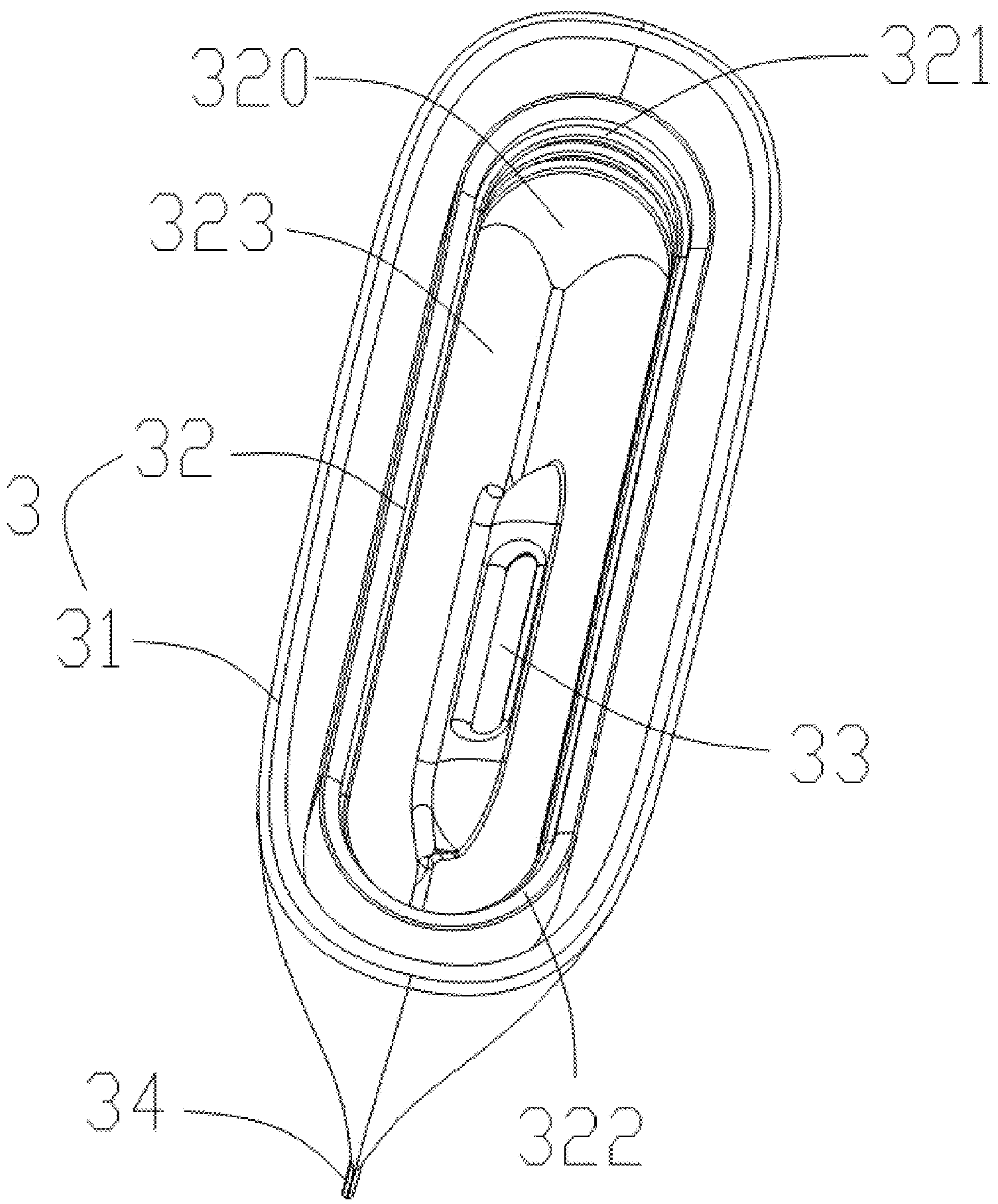
FIG. 4 is a structural diagram of a bottle cap in an embodiment of the present invention with a glue applying structure as a scraping plate.
Figure 5:
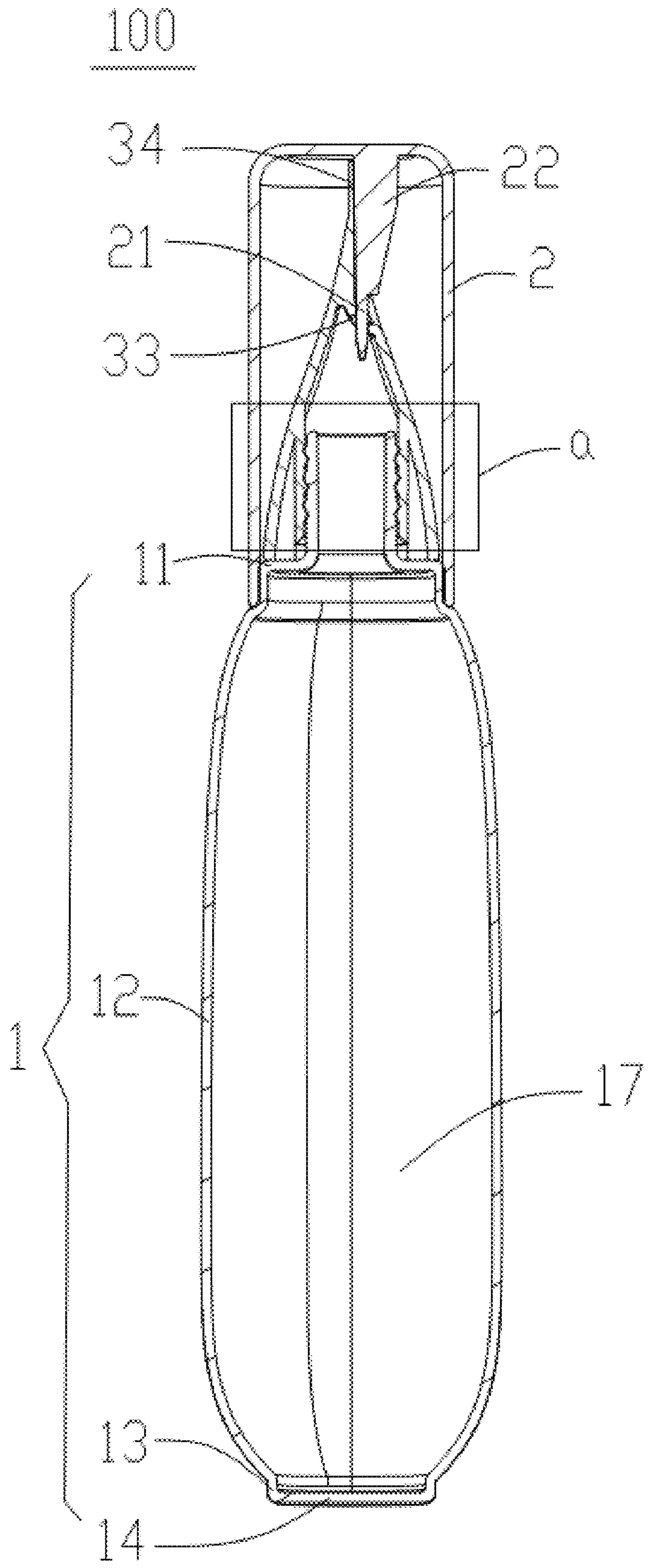
FIG. 5 is a sectional view of the present invention with a glue applying structure as a scraping plate and taken along a center line of a width.
Figure 6:
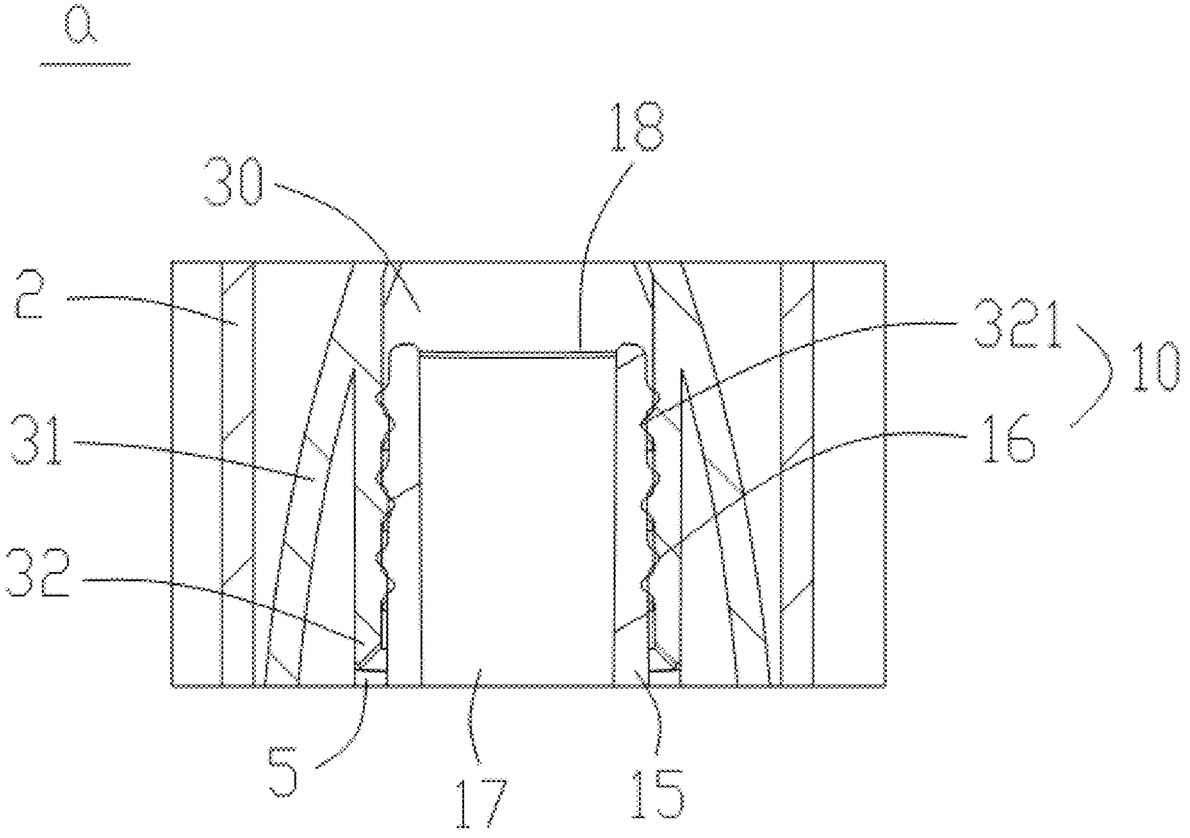
FIG. 6 is an enlarged view of area a in FIG. 5.
Figure 7:
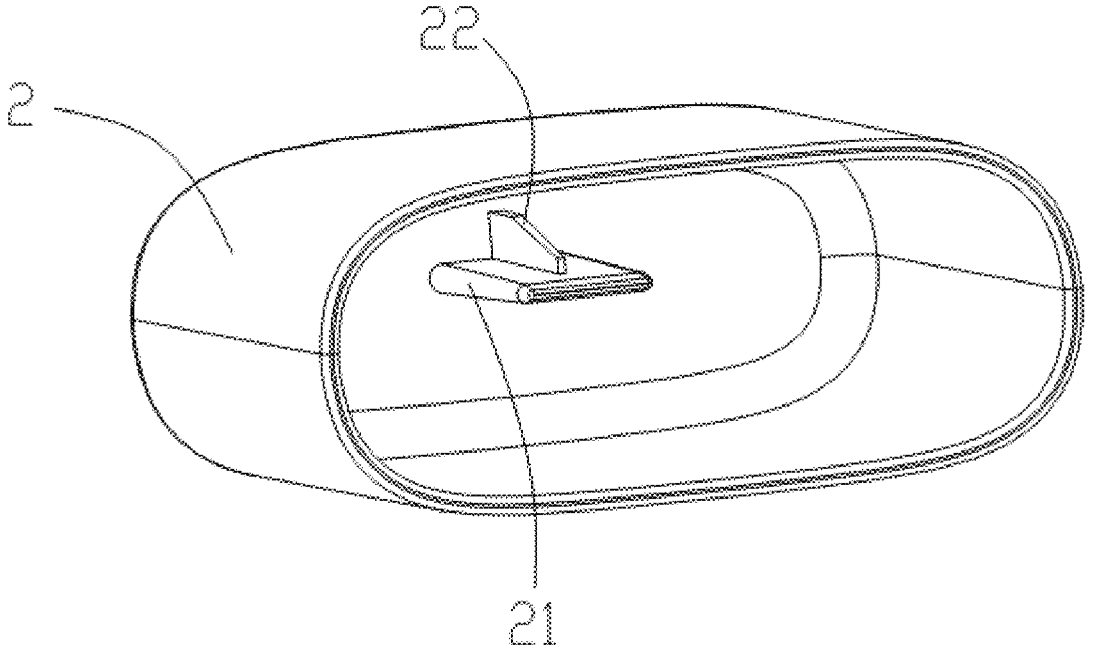
FIG. 7 is a structural diagram of an outer cover of the present invention.
Figure 8:
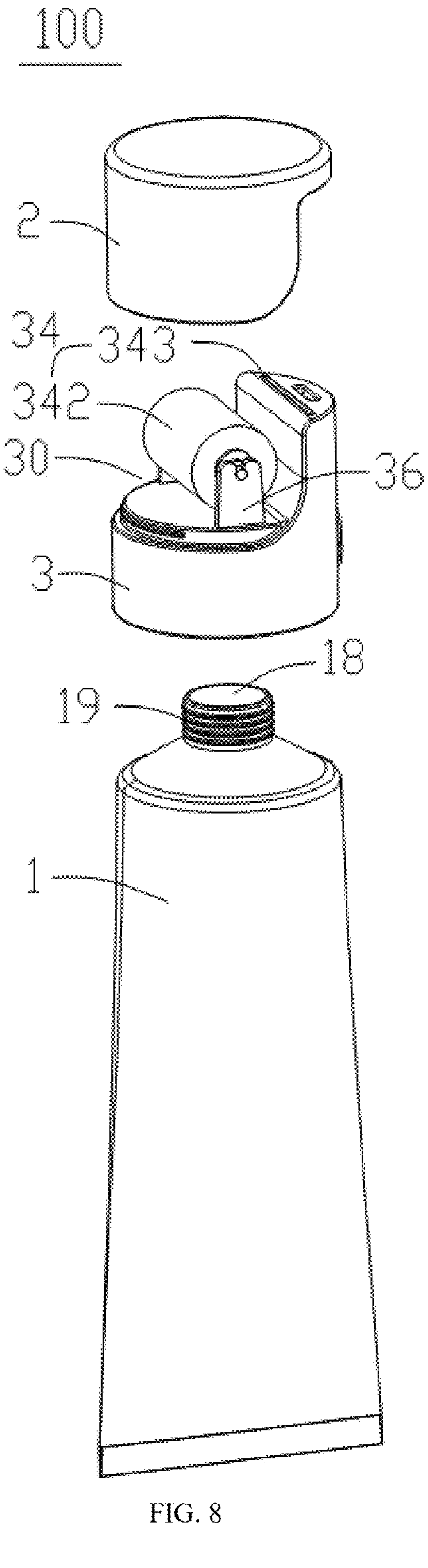
FIG. 8 is a partially exploded view of the present invention in which a glue applying structure includes a scraping plate and a roller.
Figure 9:
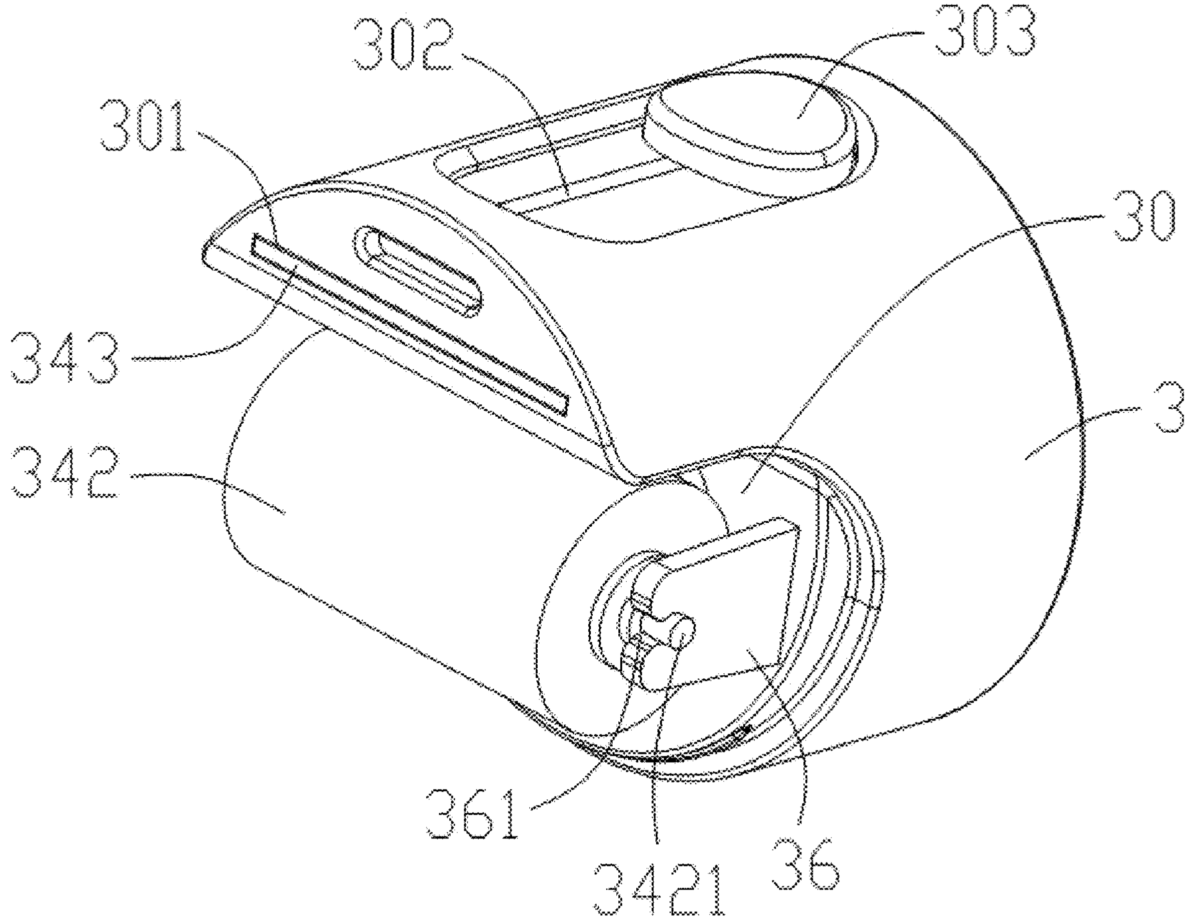
FIG. 9 is a schematic diagram of a glue applying structure including a scraping plate and a roller, with the scraping plate in a storage state, and with an outer cover and a bottle body removed according to the present invention.
Figure 10:
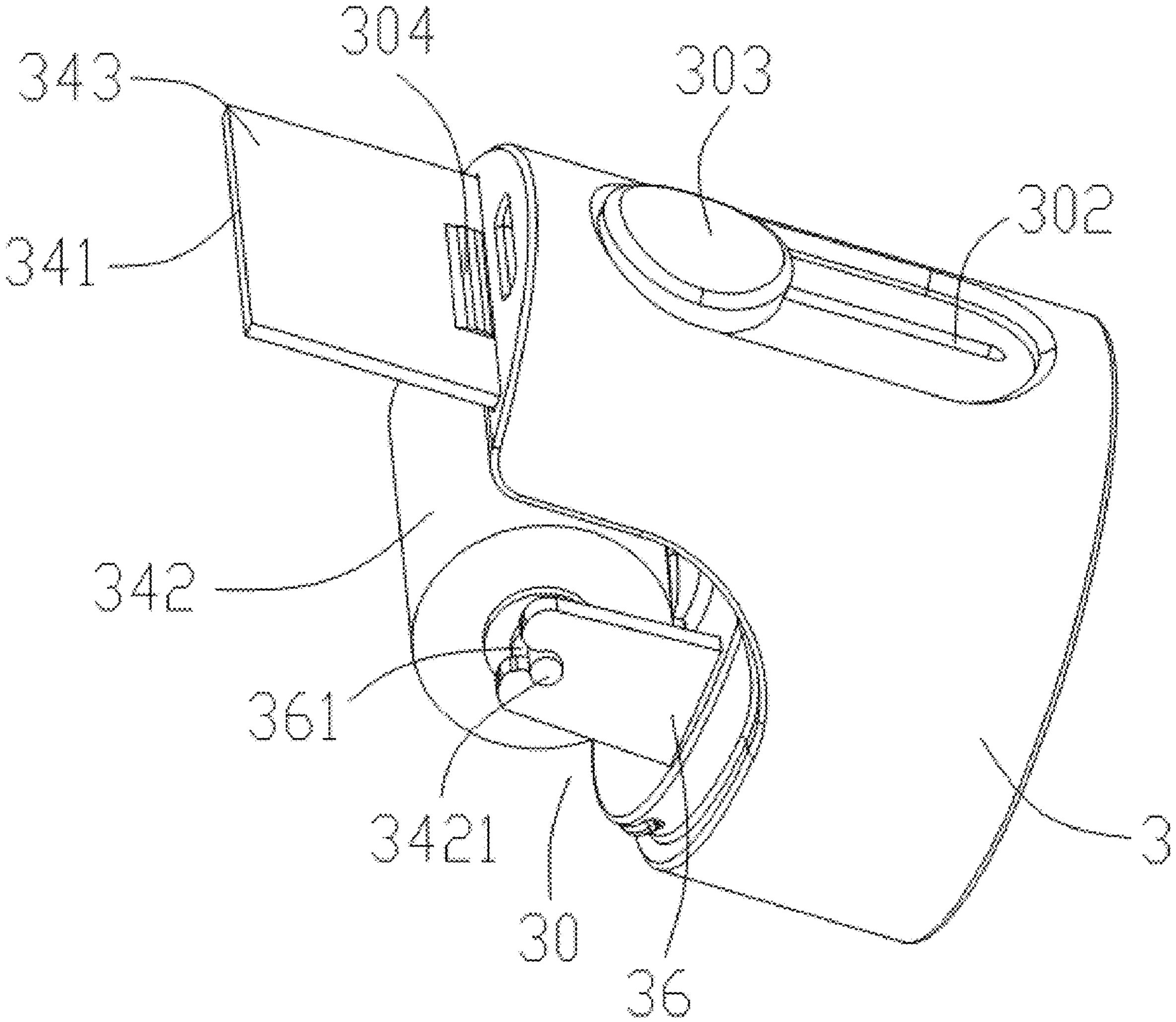
FIG. 10 is a schematic diagram of a glue applying structure including a scraping plate and a roller, with the scraping plate extending out, and with an outer cover and a bottle body removed according to the present invention.
Figure 11:
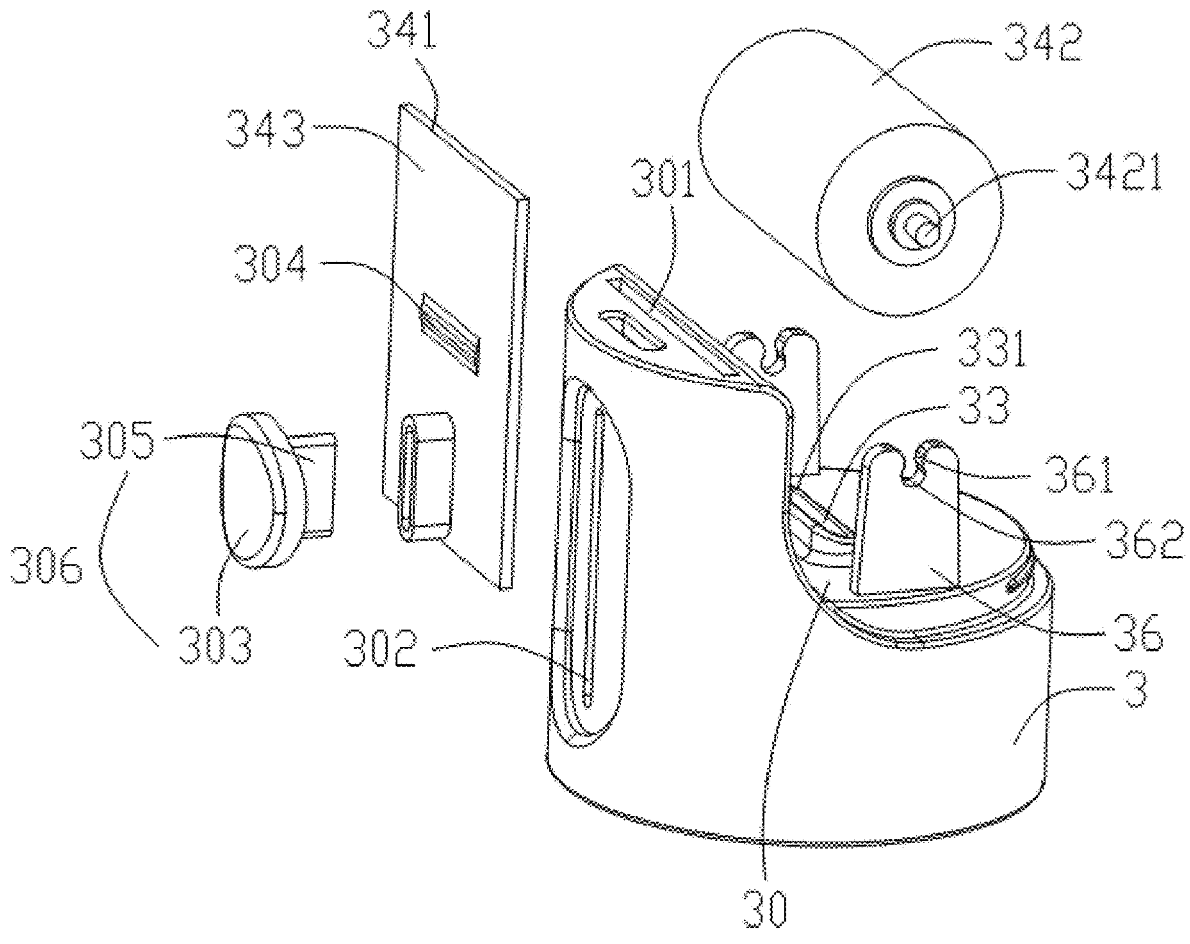
FIG. 11 is an exploded view of a glue applying structure including a scraping plate and a roller, with an outer cover and a bottle body removed according to the present invention.
Figure 12:
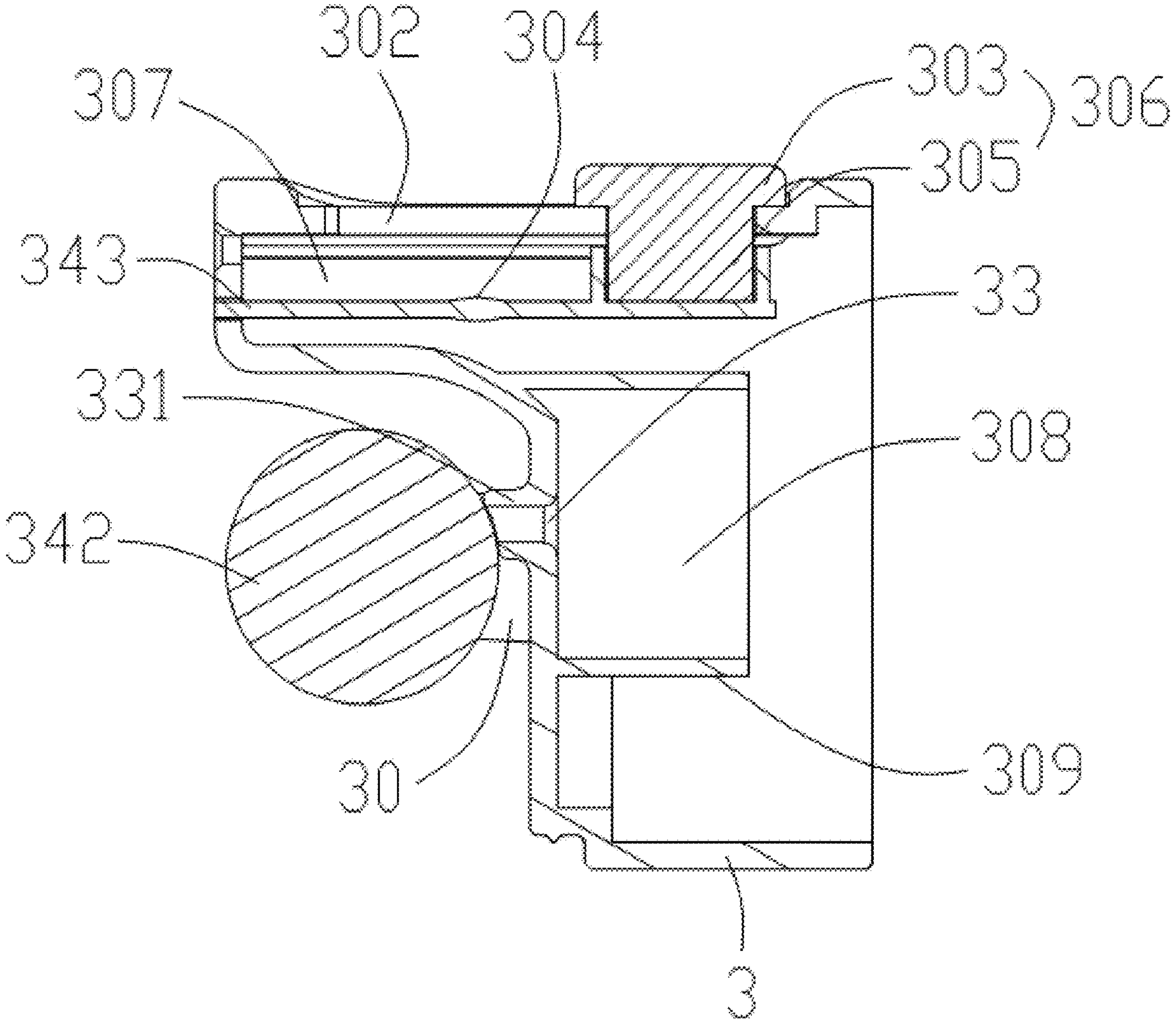
FIG. 12 is a sectional view of a glue applying structure including a scraping plate and a roller, with an outer cover and a bottle body removed, and taken along a center line of a width of a glue outlet hole according to the present invention.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising" when utilized, means "including, but not necessarily limited to"; it specifically indicates open-ended inclusion or membership in the so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one". In addition, the terms "first" and "second" are used for descriptive purposes only and cannot be understood as indicating or implying relative importance or implying the number of indicated technical features. Thus, the features defined as "first" and "second" may explicitly or implicitly include one or more of the features. In the description of embodiments of the application, "a plurality of" means two or more, unless otherwise specifically defined.

Referring to FIGS. 1-13, a glue bottle 100 is provided in an embodiment of the present invention.

The glue bottle 100 includes a bottle body 1 for a user to hold and a bottle cap 3 detachably connected to the bottle body 1. A first accommodating cavity 17 used for holding glue is defined in the bottle body 1. A top portion of the first accommodating cavity 17 is a first opening 18. A glue outlet hole 33 in communication with the first accommodating cavity 17 is defined in the bottle cap 3. A glue applying structure 34 is provided on the bottle cap 3. The glue applying structure 34 includes a glue applying end portion 341 for smoothing the glue. The glue applying end portion 341 is in a long strip shape. The glue outlet hole 33 is used for discharging glue when the bottle body 1 is squeezed by the user. The glue applying end portion 341 is used for moving when the user moves the bottle body 1, so as to apply the glue flowing out of the glue outlet hole 33 to a target surface.

In the present embodiment, the glue applying structure 34 is configured on the bottle cap 3, the glue applying structure 34 includes the glue applying end portion 341 in a long strip shape for applying glue evenly, and the bottle body 1 can be held by the user, so that when the user squeezes the bottle body 1, the glue flows out from the glue outlet hole 33 and then can be directly applied to the target surface through the glue applying end portion 341, achieving quick and thin glue application, and making the applied glue have a certain width, effectively improving the efficiency and uniformity of glue application, effectively optimizing the user experience, and being particularly suitable for bonding and fixing operations on a surface of a jigsaw puzzle. Moreover, the glue applying end portion 341 is in a long strip shape, so that corners can also be applied with glue, making it convenient for the user to use. Furthermore, the glue applying structure 34 is directly configured on the bottle cap 3, and the bottle cap 3 is used in conjunction with the bottle body 1, which makes it convenient for the user to use the glue applying end portion 341 for glue applying and reduces costs. This solves the problem that separating an existing glue applying member from the glue bottle increases costs and makes it inconvenient for the user to hold and use the glue applying member.

It should be understood that the glue applying end portion 341 is a contact position between the glue applying structure 34 and the target surface where the glue is applied. The long strip shape shall be understood as a configuration where a length is much greater than a width.

Referring to FIGS. 1-7, in one embodiment, the glue applying structure 34 includes a scraping plate 343. The scraping plate 343 is positioned at one end of the bottle cap away from the bottle body 1. The scraping plate 343 is flat, and the glue applying end portion 341 is positioned at one end of the scraping plate 343 away from the bottle body 1, so that the glue can be applied evenly and the applied glue is made thinner and lighter. After use in glue application, the scraping plate 343 is easy to clean for future use.

Specifically, the glue outlet hole 33 is defined in a side wall of the bottle cap 3, to ensure a strength of the scraping plate 343 while making the scraping plate 343 thinner and lighter. Of course, in other embodiments, the glue outlet hole 33 may also be positioned in the scraping plate 343.

In one embodiment, the glue outlet hole 33 is in a long strip shape, so as to achieve glue discharging with a larger width. In cooperation with the scraping plate 343, the glue can be more quickly applied and spread, making it more suitable for use on items that require large-area glue application. In this embodiment, the glue outlet hole 33 is spaced apart from the scraping plate 343 to avoid the risk of easy breakage at a connection area between the glue outlet hole 33 and the scraping plate 343 due to stress, thereby improving the service life of the product.

In one embodiment, the glue outlet hole 33 is arranged parallel to the scraping plate 343 to allow the glue to flow to the scraping plate 343 with a wider width. Specifically, a width of the glue outlet hole 33 is at least greater than or equal to one-fifth of a width of the scraping plate 343. The scraping plate 343 extends from one side wall of the bottle cap 3 to an opposite side wall of the bottle cap 3, thereby effectively maximizing the width of the scraping plate 343 while ensuring that the scraping plate 343 is not easily broken. Of course, in other embodiments, two sides of the scraping plate 343 may also protrude from two sides of the bottle cap 3, or the two sides of the scraping plate 343 may not protrude from the two sides of the bottle cap 3.

Of course, in other embodiments, a total number of the glue outlet holes 33 can be multiple, and the plurality of glue outlet holes 33 are arranged in a straight line, which can also increase the width of glue discharging, increase a contact surface between the glue and an object, and accelerate the spreading of the glue during application.

In an embodiment where the glue outlet hole 33 is positioned in a side wall of the bottle cap 3, a glue guiding slot 35 for guiding the glue to the scraping plate 343 can be defined in an outer side wall of the bottle cap 3, and the glue outlet hole 33 is in communication with the glue guiding slot 35. By guiding the glue via the glue guiding slot 35, it is possible to prevent the glue from flowing along both sides of the bottle cap 3 after flowing out of the glue outlet hole 33, thereby avoiding glue adhesion to other parts of the bottle cap 3 and reducing the likelihood of the glue contacting the user's hands.

Specifically, an inner side wall of the glue guiding slot 35 includes a first guiding surface 352, a first side surface 351, a second side surface 353, and a third side surface 354. The first guiding surface 352 is connected to the scraping plate 343. The first side surface 351, the second side surface 353, and the third side surface 354 are connected to the first guiding surface 352. The first side surface 351 and the second side surface 353 are distributed on two sides of the first guiding surface 352. The third side surface 354 is positioned on one side of the first guiding surface 352 away from the scraping plate 343. The glue outlet hole 33 is positioned in the third side surface 354. The third side surface 354 is in smooth transition with the first guiding surface 352, so that after the glue comes out of the glue outlet hole 33, in conjunction with the first side surface 351 and the second side surface 353, the glue can effectively flow to the scraping plate 343, allowing the user to apply and smooth out the glue, and effectively avoiding the glue from flowing to both sides of the bottle cap 3. Of course, in other embodiments, the glue outlet hole 33 may also be positioned in the first guiding surface 352.

In one embodiment, a second accommodating cavity 320 with a second opening 322 is defined in the bottle cap 3. The second accommodating cavity 320 is in communication with the first accommodating cavity 17. The glue outlet hole 33 is in communication with the second accommodating cavity 320. A width of the second accommodating cavity 320 gradually decreases in a direction close to the scraping plate 343. That is, a side wall of the second accommodating cavity 320 includes the second guiding surface 323 for guiding the glue to the glue outlet hole 33, so as to play a role of glue guiding, so that the glue is better concentrated at the glue outlet hole 33, allowing the glue to flow out from the glue outlet hole 33.

In one embodiment, a top portion of the bottle body 1 protrudes to form an embedded protrusion 15. The embedded protrusion 15 is placed inside the second accommodating cavity 320. A connecting structure 10 is provided between the embedded protrusion 15 and the bottle cap 3. The connecting structure 10 includes at least one first annular protrusion 16 arranged on an outer side wall of the embedded protrusion 15 and at least one second annular protrusion 321 protruding from an inner side wall of the second accommodating cavity 320. The first annular protrusion 16 is positioned next to the second annular protrusion 321 when the bottle cap 3 is assembled onto the bottle body 1. The second annular protrusion 321 is pressed against the outer side wall of the embedded protrusion 15, and the first annular protrusion 16 is pressed against the bottle cap 3, so as to achieve sealing between the bottle body 1 and the bottle cap 3, and to achieve a detachable connection between the bottle cap 3 and the bottle body 1. Of course, in other embodiments, the bottle body 1 may not have an embedded protrusion 15, that is, the bottle cap 3 can be directly sleeved onto one end of the bottle body 1.

In one embodiment, a sealing rubber ring 5 used for sealing is provided between the bottle cap 3 and the bottle body 1. By using the sealing rubber ring 5 to press against the bottle cap 3 and the bottle body 1, the glue can be further prevented from leaking out from a gap between the bottle cap 3 and the bottle body 1, effectively achieving a sealing effect.

In one embodiment, in order to improve the compactness and strength of the structure of the bottle cap 3, the bottle cap 3 includes an outer shell 31 and an annular inner shell 32 arranged inside the outer shell 31. The second accommodating cavity 320 is positioned in the annular inner shell 32. One end of the annular inner shell 32 close to the glue applying structure 34 is connected to an inner side wall of the outer shell 31. Moreover, for the convenience of the production and manufacturing of the bottle cap 3, the annular inner shell 32, the outer shell 31, and the glue applying structure 34 are integrally formed.

In one embodiment, in order to improve the strength of the bottle body 1, the bottle body 1 includes a bottle top 11, a first bottle wall 12, a second bottle wall 13, and a bottle bottom 14 connected in sequence from top to bottom. A top portion of the bottle top 11 protrudes to form the embedded protrusion 15. A width and a length of a cross section of the first bottle wall 12 are both greater than a width and a length of a cross section of the bottle top 11. The width and the length of the cross section of the first bottle wall 12 are both greater than a width and a length of a cross section of the second bottle wall 13.

In one embodiment, for the glue bottle 100 to be vertically placed on a placement surface, a bottom surface of the bottle bottom 14 is a flat surface.

In one embodiment, the glue bottle 100 further includes a lid 4. The lid 4 is detachably arranged at the first opening 18 of the bottle body 1. When the lid 4 is assembled onto the bottle body 1, the first opening 18 is covered and the first accommodating cavity 17 is sealed, so that after the production of the glue bottle 100 is completed, the first accommodating cavity 17 is sealed to prevent leakage of glue. During use, the user can detach the bottle cap 3 from the bottle body 1, remove the lid 4, and then assemble the bottle cap 3 onto the bottle body 1 for the scraping plate 343 to apply glue. The lid 4 is configured for covering the first opening 18 of the bottle body 1 when leaving a factory, and is in interference fit with the bottle, so that the lid 4 seals the first accommodating cavity 17. Of course, in other embodiments, the first accommodating cavity 17 may not be sealed with the lid 4. A sealing sticker or a sealing film may be provided at the first opening 18 of the bottle body 1, which can also allow the first opening 18 to be covered and achieve the sealing of the first accommodating cavity 17. When the user uses the glue bottle 100, the sealing sticker or the sealing film can be torn off.

In one embodiment, the glue bottle 100 further includes an outer cover 2 covering the bottle body 1 or the bottle cap 3. The glue applying structure 34 and the glue outlet hole 33 are both positioned inside the outer cover 2. The use of the outer cover 2 can protect the glue applying structure 34 and provide dust prevention. It should be understood that the outer cover 2 is detachably arranged on the bottle body 1 or the bottle cap 3. Specifically, the outer cover 2 may be in interference fit with or snap-connected to the bottle body 1 or the bottle cap 3, etc. Moreover, when the outer cover 2 is in interference fit with the bottle body 1 or the bottle cap 3, and the first accommodating cavity 17 is sealed, the glue can also be prevented from leaking out of the glue out hole 33, thereby preventing the glue bottle 100 from leaking glue. Alternatively, in other embodiments, the outer cover 2 is provided with a blocking portion 21 for blocking the glue outlet hole 33. The blocking portion 21 blocks the glue outlet hole 33 when the outer cover 2 covers the bottle body 1 or the bottle cap 3, which can also prevent the glue bottle 100 from leaking glue. In further design, a thickness of the blocking portion 21 gradually decreases along one end close to the bottle body 1, and a width of the blocking portion 21 gradually decreases along the end close to the bottle body 1, so that when the outer cover 2 is assembled on the bottle body 1 or the bottle cap 3, a tail end of the blocking portion 21 can be placed inside the glue outlet hole 33.

In an embodiment where the glue outlet hole 33 is in the long strip shape, the blocking portion 21 is in a plate shape, and the outer cover 2 is also provided with a reinforcing rib 22 connected to the blocking portion 21 and used for reinforcing the blocking portion 21, so as to improve the strength of the connection between the blocking portion 21 and the outer cover 2.

Referring to FIGS. 8-12, in an embodiment where the glue applying structure 34 includes a scraping plate 343, the glue applying structure 34 also includes a roller 342 for applying glue evenly. The roller 342 is rotatably arranged on the bottle cap 3, and the scraping plate 343 is positioned next to the roller 342. After the roller 342 rolls and applies the glue, the scraping plate 343 can be used to further apply the glue more evenly and lightly, or the scraping plate 343 can be used to apply the glue to corners. An end portion of the scraping plate 343 is flatter, allowing for more flexible application of the glue to the corners.

In further design, the glue outlet hole 33 is defined corresponding to a position of the roller 342, that is, after the glue is discharged from the glue outlet hole 33, the glue can directly fall on the roller 342, so that the glue can be applied to a desired surface when the roller 342 rolls.

In further design, the scraping plate 343 is slidably disposed on the bottle cap 3. The bottle cap 3 is provided with a storage cavity 307 for storing the scraping plate 343. The scraping plate 343 is at least partially placed outside the storage cavity 307 when in a use state. The scraping plate 343 is placed inside the storage cavity 307 when in a storage state. That is, when the scraping plate 343 is not needed, the scraping plate 343 can be stored in the storage cavity 307 to avoid affecting the use of the roller 342. When the scraping plate 343 needs to be used, the scraping plate 343 can be slid out for use.

Specifically, the scraping plate 343 is equipped with an operating member 306 for user operation. The scraping plate 343 is stored in the storage cavity 307 or extends out from the storage cavity 307 when the user operates the operating member 306. Through the operating member 306, the user can store or extend the scraping plate 343.

The operating member 306 includes a connecting portion 305 connected to the scraping plate 343 and a limiting block 303 arranged on the connecting portion 305. A side wall of the bottle cap 3 is provided with a first avoidance opening 302 in communication with the storage cavity 307. The connecting portion 305 is connected to the scraping plate 343 after passing through the first avoidance opening 302. One end of the bottle cap 3 away from the bottle body 1 is provided with a second avoidance opening 301 used for the scraping plate 343 to extend out. The first avoidance opening 302 is in communication with the storage cavity 307. The limiting block 303 is positioned outside the bottle cap 3, and the scraping plate 343 can be movably fixed on the bottle cap 3 by using the limiting block 303. By moving the limiting block 303, the user can drive the scraping plate 343 to move through the connecting portion 305, so that the scraping plate 343 can be stored in the storage cavity 307 or extended out of the storage cavity 307.

In further design, the scraping plate 343 is equipped with a clamping convex block 304 used in conjunction with the second avoidance opening 301. The clamping convex block 304 is positioned outside the storage cavity 307 when the scraping plate 343 is in use. The clamping convex block 304 is placed inside the storage cavity 307 when the scraping plate 343 is in a storage state. The scraping plate 343 is fixed by the clamping convex block 304 during use, thereby preventing displacement of the scraping plate 343 that may affect glue application.

Specifically, a surface of the clamping convex block 304 is in smooth transition with a surface of the scraping plate 343, facilitating the storage and extension of the scraping plate 343.

In further design, an engaging surrounding wall 309 with an engaging slot 308 is provided on the bottle cap 3. A top portion of the bottle body 1 protrudes to form an engaging protrusion 19. The first opening 18 is positioned in the engaging protrusion 19. The engaging protrusion 19 is placed in the engaging slot 308 when the bottle cap 3 is assembled on the bottle body 1. The storage cavity 307 is positioned next to the engaging surrounding wall 309, so as to achieve the connection between the bottle cap 3 and the bottle body 1 without affecting the slidable arrangement of the scraping plate 343 on the bottle cap 3.

The detachable connection between the engaging protrusion 19 and the engaging surrounding wall 309 can be achieved through interference fit, a buckle or a thread, or by using an engagement structure in the above embodiments.

In further design, the bottle cap 3 is provided with a notch 30 at one end away from the bottle body 1. The storage cavity 307 is positioned next to the notch 30. The roller 342 is positioned at the notch 30. The glue outlet hole 33 is in communication with the notch 30. The gap 30 is used to accommodate the roller 342, that is, the roller 342 is arranged in parallel with the scraping plate 343 in the storage state. In this way, when the scraping plate 343 is in use, the scraping plate 343 can protrude significantly beyond the roller 342, effectively avoiding the influence of the roller 342 on the use of the scraping plate 343.

In further design, the bottle cap 3 protrudes at a peripheral side of the glue outlet hole 33 to form a guiding surrounding wall 331 for guiding the glue onto the roller 342. A surface of the guiding surrounding wall 331 away from the bottle body 1 abuts against an outer side wall of the roller 342, so that the glue can directly adhere to the roller 342 after flowing out of the glue outlet hole 33, preventing the glue from dripping at other positions and affecting the user experience. Specifically, the outer side wall of the roller 342 is an arc surface, and a top portion of the guiding surrounding wall 331 is also an arc surface.

In further design, the bottle cap 3 is provided with two support columns 36 arranged at intervals. The support column 36 is provided with a shaft hole 362 and a clamping opening 361. The clamping opening 361 is in communication with the shaft hole 362. Two sides of the roller 342 are each provided with a cylindrical shaft 3421. The cylindrical shaft 3421 is placed inside the shaft hole 362 to achieve rotatable connection between the roller 342 and the bottle cap 3.

In the above embodiments, a width of the scraping plate 343 is greater than 2 centimeters (cm). Of course, in embodiments without the roller 342, the width of the scraping plate 343 is preferably greater than 3 cm, such as 4 cm, 4.5 cm, 5 cm, etc., so that the user can apply glue on a large area and improve the speed of glue application on a large area.

Figure 13:
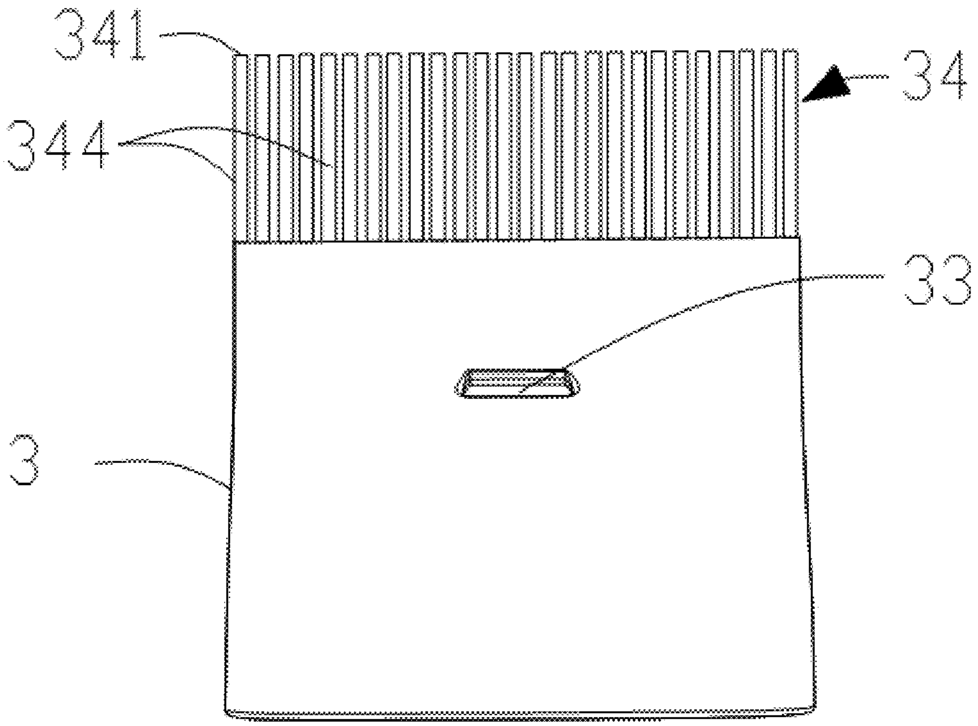
FIG. 13 is a schematic diagram of a glue applying structure configured as a brush according to the present invention.

In one embodiment, the glue applying structure 34 can also be a brush. The brush is formed by arranging a plurality of flexible rubber strips. The glue applying end portion 341 is an end portion of the brush away from the bottle body 1. The glue outlet hole 33 is positioned in one side of the bottle cap 3 away from the bottle body 1 or in a side wall of the bottle cap 3, as shown in FIG. 13. By using the brush, it is also possible to apply glue evenly and apply glue to corners of a puzzle frame, making it convenient for the user to use.

In one embodiment, the glue applying structure 34 may only be the roller 342, without including the scraping plate 343. That is, the bottle cap 3 protrudes at a peripheral side of the glue outlet hole 33 to form a guiding surrounding wall 331 for guiding the glue onto the roller 342. A surface of the guiding surrounding wall 331 away from the bottle body 1 abuts against an outer side wall of the roller 342, so that the glue can directly adhere to the roller 342 after flowing out of the glue outlet hole 33, preventing the glue from dripping at other positions and affecting the user experience. Specifically, the outer side wall of the roller 342 is an arc surface, and a top portion of the guiding surrounding wall 331 is also an arc surface.

In one embodiment, the bottle body 1 is made of a flexible material, which deforms when the user presses the bottle body 1, allowing the glue in the first accommodating cavity 17 to flow out from the glue outlet hole 33.

In one embodiment, the bottle body 1 is made using blow molding technology, and the material of the bottle body 1 can be polyethylene terephthalate (PET), polycarbonate (PC), polyethylene (PE), polypropylene (PP), polyvinyl chloride (PVC), etc. The bottle body 1 made by blow molding technology exhibits flexibility, allowing the user to squeeze glue out of the glue outlet hole 33 by pressing the bottle body 1, and the glue can be applied to the desired surface via the glue applying structure 34.

The above description only describes embodiments of the present disclosure, and is not intended to limit the present disclosure; various modifications and changes can be made to the present disclosure. Any modifications, equivalent substitutions, and improvements made within the spirit and scope of the present disclosure are intended to be included within the scope of the present disclosure.

What is claimed is:

1. A glue bottle, comprising:

a bottle body for a user to hold; and a bottle cap detachably connected to the bottle body;

wherein a first accommodating cavity used for holding glue is defined in the bottle body, and a top portion of the first accommodating cavity is a first opening;

wherein a glue outlet hole in communication with the first accommodating cavity is defined in the bottle cap, and a glue applying structure is provided on the bottle cap;

the glue applying structure comprising:

a glue applying end portion for smoothing the glue, the glue applying end portion being in a long strip shape, the glue outlet hole being used for discharging glue when the bottle body is squeezed by the user, the glue applying end portion being used for moving when the user moves the bottle body, so as to apply the glue flowing out of the glue outlet hole to a target surface, wherein the glue applying structure further comprising a scraping plate positioned at one end of the bottle cap away from the bottle body, the scraping plate being flat in structure, wherein the glue applying end portion is positioned at one end of the scraping plate away from the bottle body wherein the glue applying structure further comprises a roller rotatably arranged on the bottle cap for applying the glue evenly, wherein the scraping plate is positioned next to the roller, the glue outlet hole being defined corresponding to a position of the roller.

2. The glue bottle according to claim 1, wherein the glue outlet hole is defined in a side wall of the bottle cap.

3. The glue bottle according to claim 2, wherein the glue outlet hole is in a long strip shape, the glue outlet hole being spaced apart from a scraping plate, the glue outlet hole being arranged parallel to the scraping plate, a width of the glue outlet hole being at least greater than or equal to one-fifth of a width of the scraping plate, the scraping plate extending from one side wall of the bottle cap to an opposite side wall of the bottle cap.

4. The glue bottle according to claim 2, wherein a glue guiding slot for guiding glue to a scraping plate is defined in an outer side wall of the bottle cap; and the glue outlet hole is in communication with the glue guiding slot, an inner side wall of the glue guiding slot comprising a first guiding surface, a first side surface, a second side surface, and a third side surface, the first guiding surface being connected to the scraping plate, the first side surface, the second side surface, and the third side surface being connected to the first guiding surface, the first side surface and the second side surface being distributed on two sides of the first guiding surface, the third side surface being positioned on one side of the first guiding surface away from the scraping plate, the glue outlet hole being positioned in the third side surface, and the third side surface being in smooth transition with the first guiding surface.

5. The glue bottle according to claim 1, wherein the bottle body is made of a flexible material, and is made using blow molding technology.

6. The glue bottle according to claim 1, wherein a second accommodating cavity with a second opening is defined in the bottle cap, the second accommodating cavity being in communication with the first accommodating cavity, the glue outlet hole being in communication with the second accommodating cavity, and a side wall of the second accommodating cavity comprising a second guiding surface for guiding the glue to the glue outlet hole, a top portion of the bottle body protruding to form an embedded protrusion, the embedded protrusion being placed inside the second accommodating cavity, a connecting structure being provided between the embedded protrusion and the bottle cap, the connecting structure comprising at least one first annular protrusion arranged on an outer side wall of the embedded protrusion, and at least one second annular protrusion protruding from an inner side wall of the second accommodating cavity, the first annular protrusion being positioned next to the second annular protrusion when the bottle cap is assembled onto the bottle body, the second annular protrusion being pressed against the outer side wall of the embedded protrusion, the first annular protrusion being pressed against the bottle cap, a sealing rubber ring being provided between the bottle body and the bottle cap.

7. The glue bottle according to claim 6, wherein the bottle cap comprises an outer shell and an annular inner shell arranged inside the outer shell, the second accommodating cavity being positioned in the annular inner shell, one end of the annular inner shell close to the glue applying structure being connected to an inner side wall of the outer shell, the annular inner shell, the outer shell, and the glue applying structure being are integrally formed.

8. The glue bottle according to claim 6, wherein the bottle body comprises a bottle top, a first bottle wall, a second bottle wall, and a bottle bottom connected in sequence from top to bottom, a top portion of the bottle top protruding to form the embedded protrusion, a width and a length of a cross section of the first bottle wall both being greater than a width and a length of a cross section of the bottle top, the width and the length of the cross section of the first bottle wall being both greater than a width and a length of a cross section of the second bottle wall, a bottom surface of the bottle bottom being a flat surface.

9. The glue bottle according to claim 1, further comprising a lid, wherein the lid is detachably arranged at the first opening of the bottle body, wherein when the lid is assembled onto the bottle body, the first opening is covered and the first accommodating cavity is sealed, the lid being configured for covering the first opening of the bottle body when leaving a factory, and in interference fit with the bottle.

10. The glue bottle according to claim 1, further comprising an outer cover covering the bottle body or the bottle cap, wherein the glue applying structure and the glue outlet hole are both positioned inside the outer cover, the outer cover being provided with a blocking portion for blocking the glue outlet hole, the blocking portion blocking the glue outlet hole when the outer cover covers the bottle body or the bottle cap, a thickness of the blocking portion gradually decreasing along one end close to the bottle body, a width of the blocking portion gradually decreasing along the end close to the bottle body, the glue outlet hole being in a long strip shape, the blocking portion being in a plate shape, the outer cover being provided with a reinforcing rib connected to the blocking portion and used for reinforcing the blocking portion.

11. The glue bottle according to claim 10, wherein the bottle cap protrudes at a peripheral side of the glue outlet hole to form a guiding surrounding wall for guiding the glue onto the roller, and wherein a surface of the guiding surrounding wall away from the bottle body abuts against an outer side wall of the roller, the bottle cap being provided with two support columns arranged at intervals, the support column being provided with a shaft hole and a clamping opening, the clamping opening being in communication with the shaft hole, two sides of the roller each being provided with a cylindrical shaft, the cylindrical shaft being placed inside the shaft hole.

12. The glue bottle according to claim 1, wherein the scraping plate is slidably disposed on the bottle cap, the bottle cap being provided with a storage cavity for storing the scraping plate, the scraping plate being at least partially placed outside the storage cavity when in a use state, the scraping plate being placed inside the storage cavity when in a storage state.

13. The glue bottle according to claim 12, wherein the scraping plate is equipped with an operating member for user operation, and the scraping plate is stored in the storage cavity or extends out from the storage cavity when the user operates the operating member, the operating member comprising a connecting portion connected to the scraping plate and a limiting block arranged on the connecting portion, a side wall of the bottle cap being provided with a first avoidance opening in communication with the storage cavity, the connecting portion being connected to the scraping plate after passing through the first avoidance opening, one end of the bottle cap away from the bottle body being provided with a second avoidance opening used for the scraping plate to extend out, the first avoidance opening being in communication with the storage cavity.

14. The glue bottle according to claim 13, wherein the scraping plate is equipped with a clamping convex block used in conjunction with the second avoidance opening, the clamping convex block being positioned outside the storage cavity when the scraping plate is in use, the clamping convex block being placed inside the storage cavity when the scraping plate is in a storage state, a surface of the clamping convex block being in smooth transition with a surface of the scraping plate.

15. The glue bottle according to claim 12, wherein an engaging surrounding wall with an engaging slot is provided on the bottle cap, a top portion of the bottle body protruding to form an engaging protrusion, the first opening being positioned in the engaging protrusion, the engaging protrusion being placed in the engaging slot when the bottle cap is assembled on the bottle body, and the storage cavity being positioned next to the engaging surrounding wall.

16. The glue bottle according to claim 12, wherein the bottle cap is provided with a notch at one end away from the bottle body, the storage cavity being positioned next to the notch, the roller being positioned at the notch, the glue outlet hole being in communication with the notch.

17. The glue bottle according to claim 1, wherein the glue applying structure is a brush which is formed by arranging a plurality of flexible rubber strips, the glue applying end portion being an end portion of the brush away from the bottle body, the glue outlet hole being positioned in one side of the bottle cap away from the bottle body or in a side wall of the bottle cap.

* * * * *